March 24, 1959 J. W. ANDERSEN 2,879,085
CHANGING PRESSURE SEALS ON HIGH PRESSURE EQUIPMENT
Filed July 15, 1957
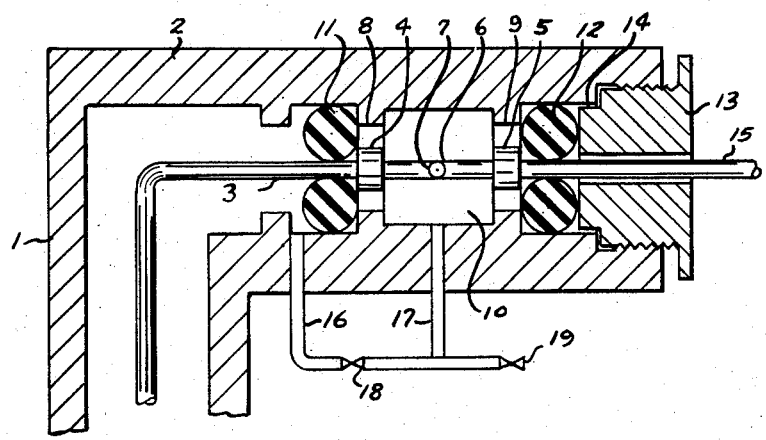
INVENTOR.
JOHN W. ANDERSEN
BY
Herman O. Bauermeister
ATTORNEY

United States Patent Office 2,879,085
Patented Mar. 24, 1959

2,879,085

CHANGING PRESSURE SEALS ON HIGH PRESSURE EQUIPMENT

John W. Andersen, Dayton, Ohio, assignor to Monsanto Chemical Company, St. Louis, Mo., a corporation of Delaware Application July 15, 1957, Serial No. 671,925

1 Claim. (Cl. 286—16.3)

This equipment relates to mechanical seals in high pressure equipment such as autoclaves and valves. The mechanical problems in sealing rotary and reciprocating shaft agitators in pressure vessels are especially apparent when the gaskets and other seals must be changed. The entire system must be shut down, purged and cleaned in order to make it possible for the agitator and valve packings to be changed by conventional methods.

The present invention relates to angularly movable actuators which must be pressure-sealed into the walls of pressure vessels. Examples of such angular actuators include axially vibrating agitators such as are described in copending application Serial No. 665,783, filed June 14, 1957, and high pressure valves which are described in copending application Serial No. 668,396 filed June 27, 1957.

More specifically the present invention relates to a method for changing O-ring seals on such actuators in high pressure vessels and valves.

Accordingly, an object of this invention is to provide a device in which the mechanical seal which secures the actuator may be changed while maintaining full pressure in the equipment.

Further objects and advantages will become evident as the description proceeds.

In accordance with my invention I provide a suitable hollow metallic housing, an angularly oscillatable or vibratory lever pivoted therein by means of a suitable fulcrum and adapted to undergo angular oscillation at small amplitude about said fulcrum within said housing. The lever is provided with an area of generally circular cross section. In contact with said circular section I provide a pair of elastic resilient packing elements of normally circular cross section, one of these packing elements being located on the inboard side of the said fulcrum, and the other packing element being on the outboard side. The packing elements also make contact with the interior of the said housing. A follower or gland element contacting the packing element is arranged to retain the said element in place.

In an actual test of the present seal I have found it possible to transmit oscillations from an oscillating mechanism through the present seal, the frequency of oscillations being at approximately 3600 cycles per minute, while withstanding a continuous gas pressure of 36,000 p.s.i.

For a further understanding of the present invention, reference is made to the accompanying drawing showing a longitudinal section of the device employing a cylindrical pin as the fulcrum about which the lever oscillates.

The drawing shows in longitudinal section an embodiment of my design in which numeral 1 represents a portion of the housing or body member, the same having a center opening or passageway 2 therethrough within which I provide oscillatably mounted lever 3. This lever 3 is provided with shoulders 4 and 5 (which may also exist as a single continuous shoulder), being of somewhat increased diameter as compared with the lever diameter, such shoulder diameter however being sufficiently smaller than the size of opening 2 in the housing 1 so as to permit free oscillation of the lever about a center 6. Coinciding with this center, I provide pin 7 extending completely through the lever and also into housing 1. The portion of the housing adjacent to the shoulders 4 and 5 is provided with abutments 8 and 9 (which may also exist as a single continuous abutment) defining an abutment zone 10 within the said housing.

It will, of course, be understood by those skilled in the art that the metallic parts of my device will be constructed of suitable metals or alloys having a strength adequate to withstand the working pressure to which the device will be subject in use.

Lever 3 carries the resilient elastic solid section packing ring 11, commonly referred to as an O-ring, and for the purpose of retaining the same on the inboard side of the shoulder and abutment, the lever is made slightly larger than is the internal diameter of the O-ring so as to somewhat stretch the O-ring when it is positioned against the shoulder 4. Shoulder 5 on the outboard side thereof also carries an O-ring 12 retained against abutment 9. In order to retain the O-ring in place after assembly and when pressurized, a follower or gland 13 is threaded into the housing of body 1. This follower carries a projecting ring 14 against which the O-ring abuts, the internal opening of the follower being also sufficiently large so as to permit free angular oscillation of the lever 2.

It will be understood, as will be explained in more detail later, that the outboard end 15 of the lever 3 may be actuated by a cam system for precise movement. In another embodiment of the invention lever 3 may be actuated by a mechanical oscillator at a high rate of speed, and the motion so generated is transmitted by the lever to the inboard end 16 of the lever, this inboard end being directly coupled to the agitator and, accordingly, will transmit its motion thereto. It will, of course, be obvious that the oscillatory motion of the lever will be in a plane at right angles to the axis of the pin 7. The amplitude of oscillation of the lever will desirably be rather low, usually less than about 10° of arc, while the velocity of oscillation will be high, that is, generally from several hundred to several thousand cycles per minute. The effectiveness of agitation of the agitator driven by the present device depends primarily upon the rapidity of the oscillation rather than upon the amplitude thereof depending on the kind of agitation which is desired.

When fluid pressure is applied to the interior of the reaction vessel to which the agitator and seal have been applied, O-ring 12 will be forced against shoulder 14 of follower 13 and by reason of the elasticity and resiliency of the material of which the O-ring is constructed, the same will be expanded radially both outwardly and inwardly, thus effectively sealing the crevices adjacent the lever, shoulder and housing surfaces against leakage. At the same time the oscillatory motion of the lever will not be impeded by pressure exerted by the O-ring since such pressure is uniformly exerted over the entire circumference of the shoulder 5. Indeed, it has been found that there is very little difference in the amount of energy required to oscillate the lever whether or not high pressure is exerted against the device.

During operation of the lever 3, the O-ring will be seen to undergo a slight kneading action because of the fact that the surface of shoulder 5 in contact with the ring undergoes a slight, but continuous, oscillation, the effect of which is to increase the life and elasticity of the resilient material of which the ring is constructed.

The present apparatus includes a second O-ring 11 serving as an idler during ordinary pressure operation since O-ring 12 is the normal sealing means to hold pressure within housing 1. Inasmuch as ring 12 is therefore subjected to continued flexing in wear, it eventually becomes necessary to replace this ring. In order to accomplish such change without stopping the apparatus and releasing the pressure within housing 1, the following system of lines of piping and valves is employed. An outlet line 16 passes from the interior 2 of the housing 1. Line 16 communicates with another outlet line 17 which passes through housing 1 from the abutment zone 10. Lines 16 and 17 are connected by valve means 18. Line 17 is also provided with a vent 19, although the vent into the abutment zone 10 may also be provided by a separate line instead of by a unitary system such as is shown in the present embodiment.

The operation of the present apparatus in changing the working O-ring 12 is as follows: In ordinary operation of the vessel as a high pressure system, valve 18 is opened and valve 19 is closed. Consequently, the internal pressure within space 2 is equalized around the idler O-ring 11 and all of the pressure is exerted upon the working O-ring 12. When it is necessary to change this working O-ring 12, valve 18 is closed and valve 19 is opened causing the pressure within the abutment zone 10 to be lowered to atmospheric pressure. However, the space 2 within housing 1 is still under the full pressure of the system, which thus causes the idler O-ring 11 to be seated between shoulder 4 and abutment 8, thus sealing the system against loss of pressure. Inasmuch as O-ring 12 now has atmospheric pressure at each side of it, it is possible to remove follower 13 and the O-ring 12. A new O-ring is then installed and follower 13 is again closed upon the new O-ring 12.

In order to restore the system to working conditions, valve 19 is again closed, and valve 18 is opened, thus allowing the idler O-ring to relax and causing the pressure seal ring 12 to reseat, thus securing the pressure within space 2 as O-ring 12 bears against abutment 9, shoulder 5 and shaft 3. Thus, the sealing means may be changed as necessary without reducing the pressure within the housing 1.

What I claim is:

A device of the character described, including a housing, a pair of abutments within the said housing defining an abutment zone within said housing, an oscillatably mounted lever supported in the said housing within the said abutment zone, the said lever having a substantially circular cross section at least at the points adjacent said abutments, a pair of resilient sealing means of normally circular cross section adjacent said circular lever sections and adapted to form a pressure-tight seal between the said abutments and the said circular cross sections, an outlet line from the interior of the said housing, an outlet line from the abutment zone, a valve between the two said outlet lines and a vent from the said abutment zone.

References Cited in the file of this patent
UNITED STATES PATENTS 1,861,755    Rasmussen _____ June 7, 1932